United States Patent [19]
Bruno et al.

[11] Patent Number: 5,784,561
[45] Date of Patent: Jul. 21, 1998

[54] ON-DEMAND VIDEO CONFERENCE METHOD AND APPARATUS

[75] Inventors: Richard Frank Bruno, Morristown; Robert Edward Markowitz, Glen Rock, both of N.J.

[73] Assignee: AT&T Corp., Middletown, N.J.

[21] Appl. No.: 673,980

[22] Filed: Jul. 1, 1996

[51] Int. Cl.$^6$ .................................................. G06F 17/00
[52] U.S. Cl. ........................................................ 395/200.34
[58] Field of Search .......................... 395/200.34, 200.35, 395/200.36, 200.79, 200.8; 345/330, 331; 370/30, 112; 379/201, 207, 230

[56] References Cited

U.S. PATENT DOCUMENTS

| | | | |
|---|---|---|---|
| 5,099,510 | 3/1992 | Blinken et al. | 379/206 |
| 5,136,581 | 8/1992 | Muehrcke | 379/206 |
| 5,315,633 | 5/1994 | Champa | 348/16 |
| 5,392,223 | 2/1995 | Caci | 395/200.34 |
| 5,422,883 | 6/1995 | Hauris et al. | 379/206 |
| 5,473,363 | 12/1995 | Ng et al. | 348/15 |
| 5,491,797 | 2/1996 | Thompson et al. | 379/206 |
| 5,530,472 | 6/1996 | Bregman et al. | 379/201 |
| 5,608,786 | 3/1997 | Gordon | 379/206 |
| 5,617,539 | 4/1997 | Ludwig et al. | 395/200.35 |
| 5,659,692 | 8/1997 | Poggio et al. | 345/330 |

*Primary Examiner*—Ellis B. Ramirez
*Attorney, Agent, or Firm*—Stephen M. Gurey

[57] ABSTRACT

The invention provides an on-demand real-time video conefrencing system in a circuit switched communications network. The on-demand real-time video conferencing system includes at least one video conference control system that receives an on-demand request for a video conference from a user and, in real-time, allocates video conferencing resources and connects the user with at least one other video conference participant through the circuit switched communications network. Each of the at least one video conference control system includes a video conference connection unit and a voice response unit. The video conference connection unit includes a plurality of video ports coupled to the circuit switched communications network. The video conference control system connects the user with the at least one other video conference participant based on the number of total video conference participants, the number of video ports available in the at least one video conference control system and the available connection paths in the circuit switched communications network.

24 Claims, 3 Drawing Sheets

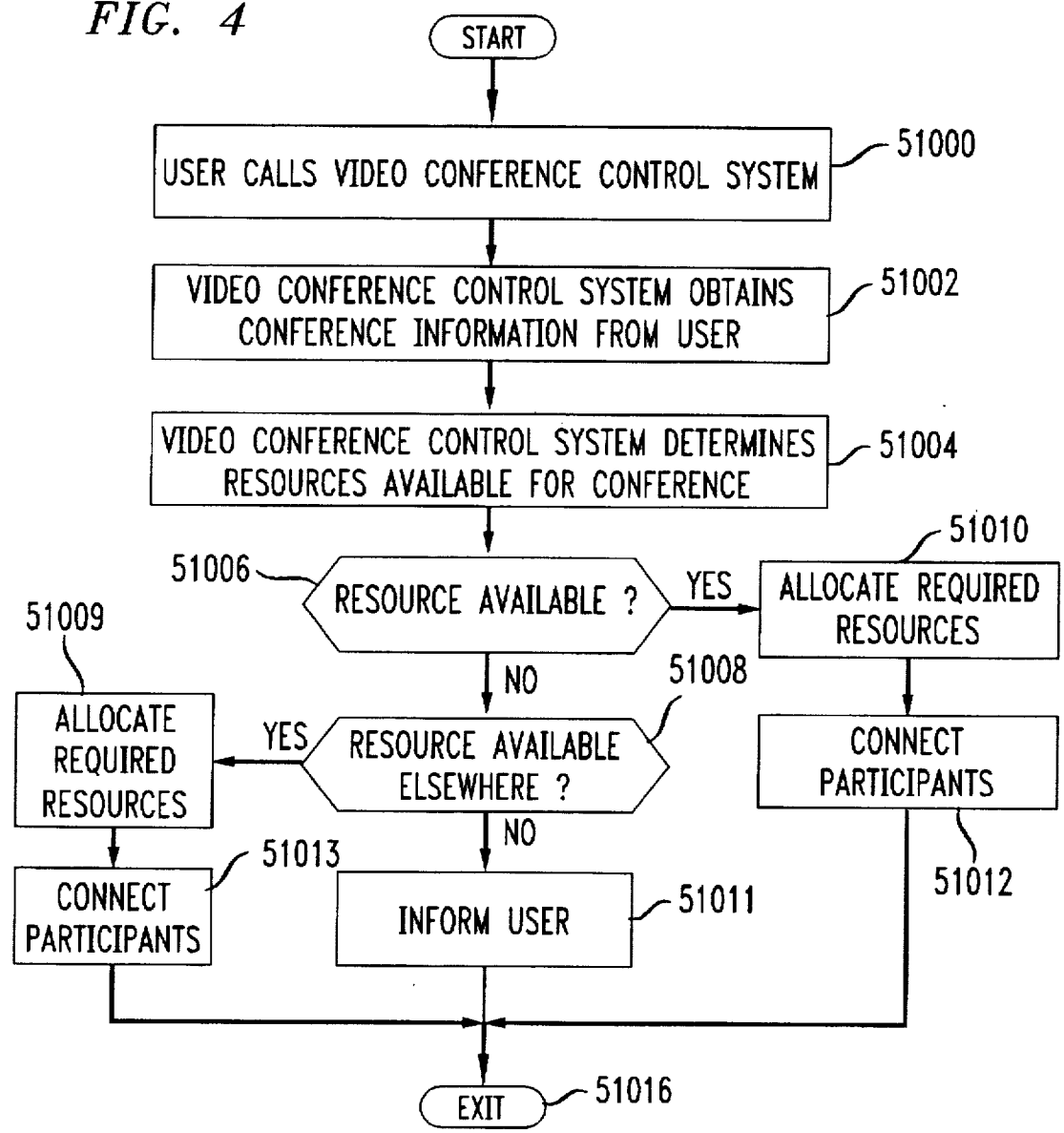

ON-DEMAND VIDEO CONFERENCE METHOD AND APPARATUS

BACKGROUND OF THE INVENTION

1. Field of the Invention

This invention relates to an apparatus and method for on-demand real-time video conferencing in circuit switched communication networks.

2. Description of Related Art

Conventional circuit switched video conference technology requires users to make reservations for video conferences similar to the procedure for reserving a conference room for a meeting. A user contacts a customer care agent of the video conference service provider. The customer care agent schedules a time for the video conference when resources such as video conferencing ports, network connections, etc. that are required for the video conference are available. After the video conference is scheduled, the user then informs other video conference participants so that all the participants may call the video conference system at the schedule video conference time.

The above process requires a costly customer care agent to pre-allocate video conference system resources which in turn requires the inconvenience of scheduling a video conference. Thus, technological improvements are needed to reduce the cost and inconvenience of video conferencing.

SUMMARY OF THE INVENTION

The invention provides an on-demand real-time video conferencing system in a circuit switched communications network. The on-demand real-time video conferencing system includes at least one video conference control system. The at least one video conference control system receives an on demand request for a video conference from a user and allocates video conferencing resources and connects the user with at least one other video conference participant through the circuit switched communications network based on the on demand request received from the user and availability of the at least one video conference control system and the circuit switched communications network.

Each of the at least one video conference control system includes a video conference connection unit, a voice response unit and a meeting reservation controller coupled to the video conference connection unit and the voice response unit. One of the at least one video conference control system is selected to respond to a call from the user. The meeting reservation controller of the selected one of the at least one video conference control system receives the on-demand request from the user through a voice response unit of the selected one of the at least one video conference control system.

The video conference connection unit includes a plurality of video ports coupled to the circuit switched communications network. At least one audio port is coupled to the circuit switched communications network through one of the plurality of video ports. The audio port is also coupled to the voice response unit. The meeting reservation controller outputs prompts to the user and receives the on-demand request from the user through the audio port. The on-demand request from the user includes at least one telephone number of at least one other video conference participant.

BRIEF DESCRIPTION OF THE DRAWINGS

The invention is described in detail with reference to the following drawings, wherein like numerals represent like elements:

FIG. 4 is a process for initiating an on-demand in real-time video conference.

DETAILED DESCRIPTION OF PREFERRED EMBODIMENTS

The invention provides an apparatus and method for users to conduct a video conference on-demand in real-time using circuit switched communications networks. The on-demand in real-time video conference apparatus may be implemented by using hardware units such as application specific integrated circuit (ASICs) or programs executed in a processor. The apparatus interacts with a user in real-time to initialize a video conference by automatically allocating video conferencing resources required for the video conference and calling the video conference participants.

The circuit switched communications networks are narrow-band, dedicated-line systems as opposed to wide band, high speed, packet switching systems such as token ring, Ethernet UNI, fiber channel standard, FDA, FDA-II, DQDB, ATM and B-ISBN. These types of transmission systems have data transfer rates from about 16M bit/sec to over 600M bit/sec. Packet switching networks do not provide dedicated physical lines but provide virtual bandwidth channels. Data from a source is divided into packets and the packets are transmitted on the same physical lines as packets of data from other sources. In the wide band, high speed, packet switching networks, a call set-up procedure must be implemented to establish a communication pathway and the communication pathway must be torn down after the call is completed.

In contrast, the circuit switched communications networks are narrow-band, low-speed networks. Data transfer rates range between about 56 k bit/sec and 1536 K bits/sec in 56 or 64 K bit/sec increments. In circuit switched communications networks, channels do not need to be set-up and torn-down because the physical communication lines are totally dedicated to a specific caller. Circuit switched communication is accomplished by direct-line-connects through circuit switches. Thus, wide band, high speed, packet switching networks are totally different than narrow-band, low speed, circuit switched networks.

Figure 1:
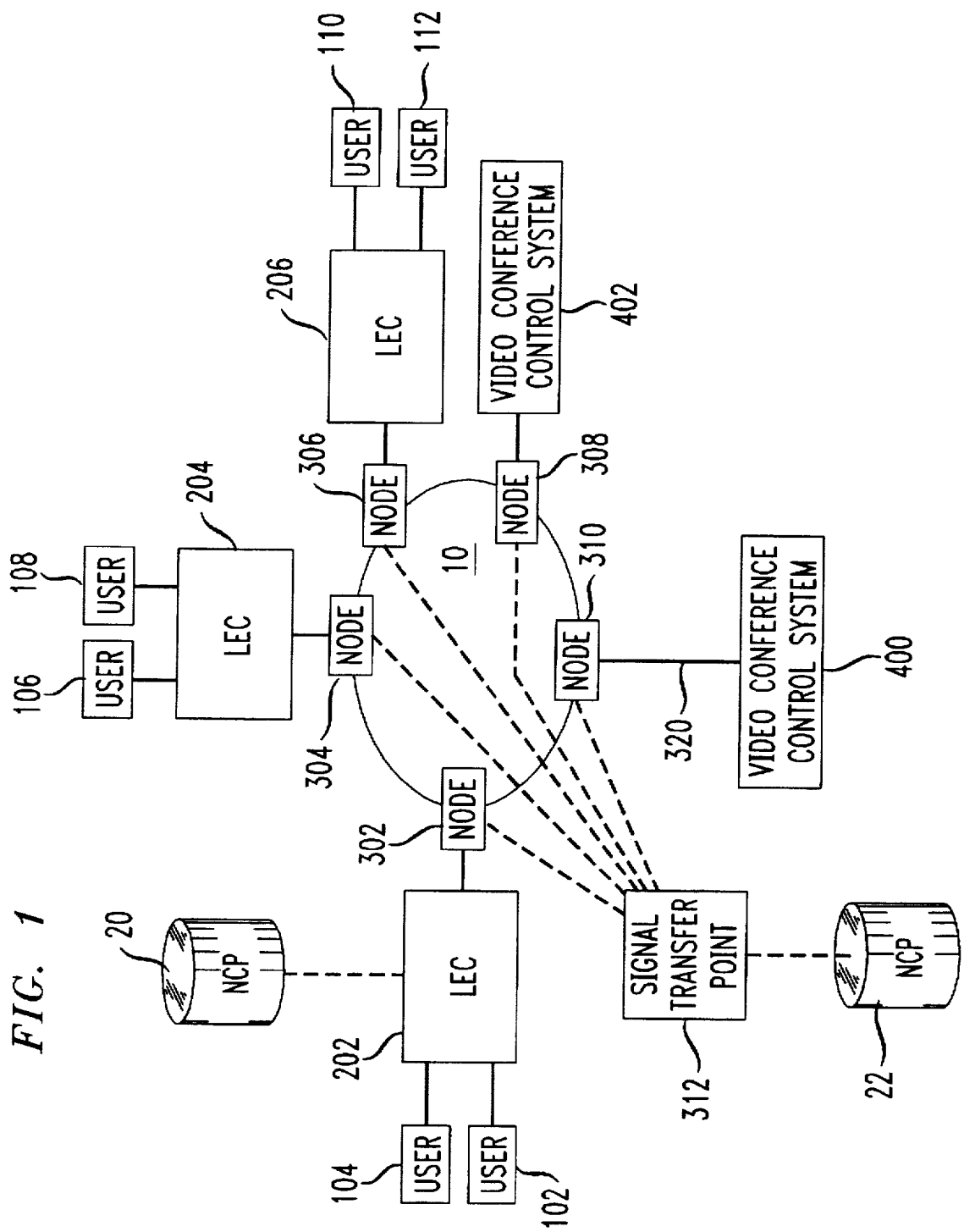
FIG. 1 is a diagram of a video conference control system connected to a plurality of users through a circuit switched communications network.

FIG. 1 shows a plurality of users 102–112 connected to each other and to a video conference control system 400 through local exchange carriers (LECS) 202–206 and an interexchange carrier (IXC) circuit switched communications network 10. The IXC circuit switched communications network 10 includes a plurality of nodes 302–310. Any user, such as user 102 for example, may initiate a video conference in real-time by calling an assigned telephone number, an 800 number for example, of the video conference control system 400.

Once the user 102 dials the 800 number associated with the video conference control system 400, the LEC 202 consults a network control point (NCP) 20 to determine the IXC associated with that particular 800 number. The LEC 202 passes call signaling information to the IXC via a Signal Transfer Point 312 which is a point of signaling network interconnection, preferably SS7 signaling. The nodes 302–310, video conference control systems 400 and NCP 22 are connected to the Signal Transfer Point 312. The LEC 202 in turn routes the call to the appropriate IXC network for call routing. The IXC node 302 queries NCP 22 for routing instructions in order to terminate the call at the video conference control system 400 which is located in the IXC circuit switched communications network 10. Although this is a simplified version, other advanced routing features such as area code, time of day routing, etc. could also be incorporated.

The NCP 20 is a database accessible to the LECs 202–206 and contains information necessary for completing calls for every 800 number. After determining where the video conference control system 400 is located, the user 102 is routed to node 310 by the IXC to be connected to the video conference control system 400. After the user 102 is connected, the video conference control system 400 interacts with the user 102 and receives information necessary to allocate video conference control system resources as well as to start the video conference by calling and connecting other video conference participants with the user 102.

Figure 2:
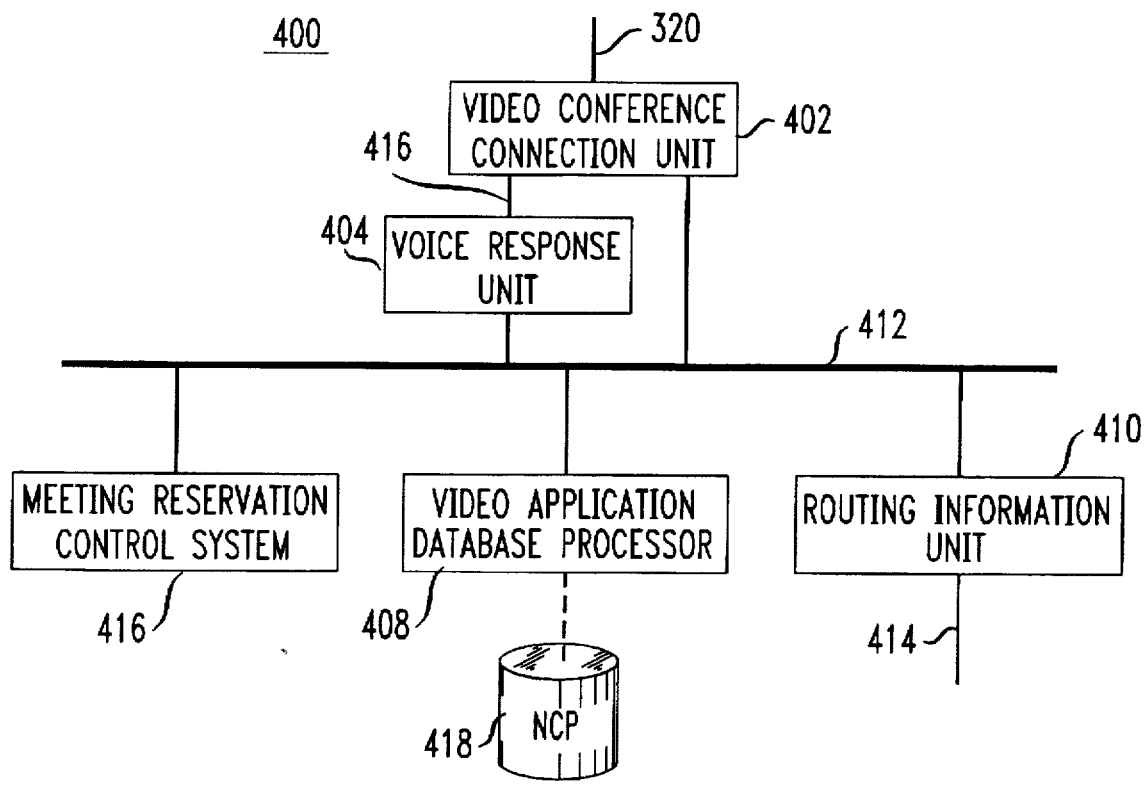
FIG. 2 is a block diagram of the video conference control system.

FIG. 2 shows that the video conference control system 400 includes a video conference connection unit 402, a voice response unit 404, a meeting reservation control system 500, a video application database processor 408 and a routing information unit 410. The video conference connection unit 402 is connected to the node 310 through signal line 320. The meeting reservation control system 500, the video application data processor 408 and the router information unit 410 are connected to the video conference connection unit 402 through signal line 412. The voice response unit 404 is connected to the video conference connection unit 402 through signal line 416 and is connected to the meeting reservation control system 500 through signal line 412.

The video conference connection unit 402 has a plurality of video ports and at least one audio port. The audio port of the video conference connection unit 402 is coupled to the voice response unit 404 through the signal line 416. When connected to the video conference control system 400, the user 102 communicates to the meeting reservation control system 500 through one of the video ports of the video conference connection unit 402 and the voice response unit 404. The meeting reservation control system 500 interacts with the user 102 to receive on-demand requests from the user 102.

The video conference connection unit 402 is implemented by commercially available devices such as the AT&T's Multipoint Control Unit (MCU, see "MCUs Help Take The Worry Out of Being There", AT&T Technology-Products Systems and Services, M. J. Koenig & M. J. Welt, Volume Nine, Number Four, Winter 1994, Pages 12–15). The MCU has a plurality of ports that are configurable into video conferencing groups. The MCU performs the process required to combine both the audio and the visual data together for each video conference group.

The voice response unit 404 may include a voice recognition device that allows the user 102 to interact with the meeting reservation control system 500 through voice. The voice response unit 404 translates the user 102's voice requests into messages recognizable by meeting reservation control system 500 and translates messages from the meeting reservation control system 500 into voice. In this manner, the meeting reservation control system 500 interacts with the user 102 and receives all the information required to configure the video conference connection unit 402 for the requested video conference. While the meeting reservation control system 500 may communicate with the user 102 via other methods such as key pad entry, voice communication is very convenient and avoids problems related to differences among many different types of video conferencing terminals.

Figure 3:
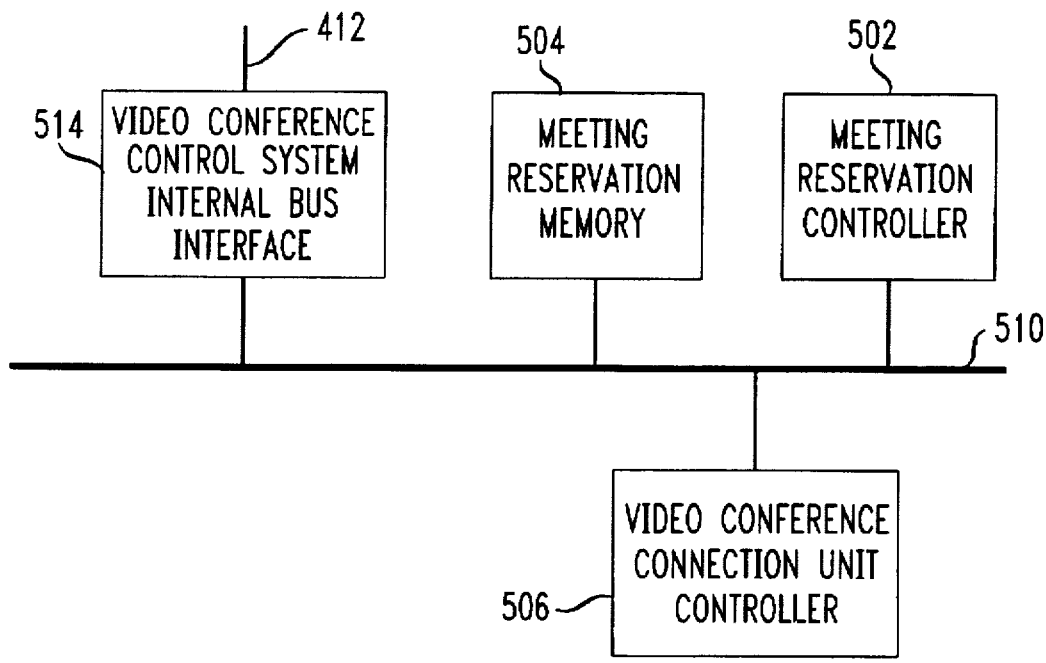
FIG. 3 is a block diagram of a meeting reservation control system.

FIG. 3 is a block diagram of the meeting reservation control system 500. The meeting reservation control system 500 includes a meeting reservation controller 502, a meeting reservation memory 504, a video conference connection unit controller 506 and a video conference control system internal bus interface 514. These meeting reservation control system 500 components are connected together by signal line 510. The video conference control system internal bus interface 514 is connected to the voice response unit 404 through signal line 412. The meeting reservation controller 502 receives messages from the voice response unit 404 through the video conference control internal bus interface 514. The information received from the user 102 is stored in a database of the meeting reservation memory 504. The meeting reservation controller 502 configures the video conference connection unit 402 based on the information received from the user 102 by sending control messages to the video conference connection unit controller 506.

The meeting reservation controller 502 interacts with the user 102 to receive information such as the number of total video conference participants and their respective video conferencing telephone numbers. Based on this information, the meeting reservation controller 502 sends control signals to the video conference connection unit controller 506 and the video application database processor 408 to allocate the available ports in the video conference connection unit 402 and connection paths in the circuit switched communications network 10, respectively. Finally, the meeting reservation controller 502 commences the video conference by connecting all the video conference participants together through the video conference connection unit 402. The video conference connection unit 402 automatically dials the video conference participants' telephone numbers received from the user 102.

If there are insufficient ports in the video conference connection unit 402 or insufficient connection paths in the circuit switched communications network 10 to connect all the video conference participants, the meeting reservation controller 502 will locate other video conference control systems, such as video conference control system 401, that may be available to satisfy the requested video conference. If video conference control system 401 has the required ports and these ports can be connected by circuit switched communications network 10 to support the requested video conference, the meeting reservation controller 502 transfers all the information supplied by the user 102 to the video conference control system 401 and redirects the user 102 from node 310 to node 308 connecting the user 102 to the video conference control system 401.

The meeting reservation controller 502 may also combine available ports of the video conference connection unit 402 with available ports of other video conference control systems such as video conference control system 401 to achieve the requested video conference. When combining the video ports of two or more video conference control systems 400, 401, the respective meeting reservation controllers 502 bridge the video ports of the different video conference connection units 402 together through the circuit switched communications network 10 to form one video conference. Each of the respective video conference connection units 402 dials the telephone numbers of the respective video conference participants and the video conference is achieved.

If no video conference control systems 400, 401 have the required connectable ports available to support the requested video conference, the meeting reservation controller 502 informs the user 102 of the situation and terminates the call. At any point during the call, a customer service agent may be connected to the user 102 to handle any unexpected circumstances that may arise. However, the use of a customer care agent should be rare thus reducing the cost of video conferencing.

While the video conference control systems 400, 401 described above dynamically configure and allocate video conferencing resources automatically on-demand and in real-time, a more simple video conference control system 400, 401 may also be possible. In the more simple approach, each of the video conference systems 400, 401 are preconfigured into groups of N ports where N could be a number determined by parameters such as the most commonly desired number of video conference participants. One of the N ports is used to receive the call from the user 102 and the remaining ports are used to dial out to other video conferencing participants.

When the 800 number of the video conference control system 400, 401 is called, the user 102 is routed to the geographically nearest video conference control system 400, 401. If the resources are available at the video conference control system 400, 401, then the corresponding meeting reservation controller 502 answers the call. Otherwise, the user 102 receives a busy signal. Thus, the video conference control system 400, 401 do not dynamically allocate the video conferencing resources because if resources are not available, the user 102 would be immediately informed by the busy signal.

The routing information unit 410 of FIG. 2 is connected to a network (not shown) through signal line 414. A database is maintained by the routing information unit 410 that reflects the status of the circuit switched communications network 10 including available video conference control system resources. When connection paths through the circuit switched communications network 10 becomes unavailable for reasons such as allocation to other users or equipment failure, the routing information unit 410 updates the database so that the most current status of the circuit switched communications network 10 is reflected.

When a control signal is received from the meeting reservation controller 502, the video application database processor 408 allocates connection paths of the circuit switched circuit switched communications network 10 based on the current status of the circuit switched communications network 10 maintained by the routing information unit 410. In addition, the video application database processor 408 updates the network control point (NCP) 22 to reflect the effect of the most current port allocations of the video conference connection unit 402 and connection path allocations of the circuit switched communications network 10.

The NCP 22 is commonly accessible to the nodes 302-310. The information in the NCP 22 permits the nodes 302-310 to route a call requesting a video conference to the video conference control system 400, 401 that has the closest available resources. Thus, when the user 102 calls for a video conference, the node 302 may access NCP 22 and connect the user 102 to either of the video conference control systems 400, 401 based on the information in the NCP 22. If all resources were busy at that location advanced routing features (for example Next Available Agent) would route the call the next video conference connection unit 402.

FIG. 4 shows a process of the meeting reservation controller 502 for responding to the user 102 in real-time to set-up a video conference. In step S1000, the user 102 calls a video conference control system 400, 401 by dialing the appropriate 800 number. The user 102 is connected to one of the video conference control systems 400, 401 (for this discussion, video conference control system 400 is connected to the user 102). The meeting reservation controller 502 receives the call and goes to step S1002. In step S1002, the meeting reservation controller 502 obtains information from the user 102 such as the number of conference participants and their respective telephone numbers. Then, the meeting reservation controller 502 goes to step S1004.

In S1004, the meeting reservation controller 502 issues control signals to the video conference connection unit controller 506 and the video application database processor 408 to query whether resources required for supporting the requested video conference are available. Then, the meeting reservation controller 502 goes to S1006. In step S1006, if the resources are available, then the meeting reservation controller 502 goes to step S1010; otherwise the meeting reservation controller 502 goes to step S1008.

In step S1008, the meeting reservation controller 502 determines if resources from other video conference control systems (video conference control system 401 for example) are available for the requested video conference. If resources from other video conference control systems 401 are available, then the meeting reservation controller 502 goes to step S1009; otherwise the meeting reservation controller 502 goes to step S1011. In step S1011, the meeting reservation controller 502 informs the user 102 that resources are not currently available to support the requested conference and goes to step S1016 to end the video conference set-up process.

In step S1009, the meeting reservation controller 502 either transfers the user 102 to the other video conference control system 401 that has the connectable ports to support the requested video conference or bridges to the other video conference control system(s) for the additional ports needed to meet the requirements of the requested video conference. In either case, the required number of ports and the needed connection paths of the circuit switched communications network 10 are allocated and the meeting reservation controller 502 (and/or the meeting reservation controller of the other video conference control system(s)) goes to step S1013. In step S1013, the meeting reservation controller 502 connects the video conference participants and goes to step S1016 to end the video conference set-up process leaving the video conference participants in the video conference.

In step S1010, the meeting reservation controller 502 allocates the required resources by sending control signals to the video conference connection unit controller 506 and to the video application database processor 408. Then, the meeting reservation controller 502 goes to step S1012. In step S1012, the meeting reservation controller 502 connects the video conference participants to the video conference and goes to step S1016 to end the video conference set-up process.

Steps S1004, S1006, S1008, S1009, S1010 and S1011 would not have to be executed for the more simple video conference control systems 400, 401 as discussed earlier. Thus, for the more simple systems, the process would go from step S1002 to step S1012 directly.

The information received by the meeting reservation controller 502 from the user 102 may contain information such as user identification number and personal identification number to control access to the video conference control system 400, 401. Also, the meeting reservation controller 502 may offer the user 102 payment options for covering the cost of the video conference. Payment methods may be selected such as 1) the user 102 paying for all video conference costs, 2) each video conference participant paying for their portion of the video conference costs or 3) all video conference participants pay according to a formula. Further, the meeting reservation controller 502 may also offer a tutorial to the user 102 for setting up a video conference and for using the video conference control system 400, 401.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An on-demand real-time video conferencing system for conducting a video conference among a plurality of users in a circuit switched communications network, comprising:

at least one video conference control system remote for users, wherein the at least one video conference control system receives an on-demand request for a video conference from a user and, in real-time, allocates video conferencing resources and connects the user with at least one other video conference participant through the circuit switched communications network based on the on-demand request received from the user and availability of the at least one video conference control system and the circuit switched communications network.

2. The on-demand real-time video conferencing system of claim 1, wherein each of the at least one video conference control system comprises:

a video conference connection unit;

a voice response unit; and a meeting reservation controller coupled to the video conference connection unit and the voice response unit, wherein one of the at least one video conference control system is selected to respond to a call from the user, a selected meeting reservation controller of the selected one of the at least one video conference control system receiving the on-demand request from the user through a voice response unit of the selected one of the at least one video conference control system.

3. The on-demand real-time video conferencing system of claim 2, wherein the video conference connection unit comprises:

a plurality of video ports coupled to the circuit switched communications network; and at least one audio port coupled to the circuit switched communications network through one of the plurality of video ports and coupled to the voice response unit, the selected meeting reservation controller outputting prompts to the user and receiving the on-demand request from the user through an audio port of the selected video conference control system, the on-demand request from the user including at least one telephone number of at least one other video conference participant.

4. The on-demand real-time video conferencing system of claim 3, wherein the selected meeting reservation controller allocates in real-time a first number of video ports of the selected video conference control system for the video conference if the selected video conference control system has the first number of video ports that are connectable to the at least one other video conference participant through the circuit switched communications network.

5. The on-demand real-time video conferencing system of claim 3, wherein if the selected one of the at least one video conference control system does not have a first number of video ports connectable to the at least one other video conference participant through the circuit switched communications network, then the selected meeting reservation controller transfers the call from the user to another one of the at least one video conference control system that has the first number of video ports connectable to the at least one other video conference participant for the video conference.

6. The on-demand real-time video conferencing system of claim 5, wherein the selected meeting reservation controller transfers the on-demand request received from the user to the another one of the at least one video conference control system when transferring the call from the user.

7. The on-demand real-time video conferencing system of claim 5, wherein if no other one of the at least one video conference control system has the first number of video ports connectable to the at least one other video conference participant, then the selected meeting reservation controller informs the user that the video conference cannot be provided and ends the call from the user.

8. The on-demand real-time video conferencing system of claim 3, wherein if the selected one of the at least one video conference control system has a second number of video ports connectable to a portion of the at least one other video conference participant through the circuit switched communications network and the second number is less than the first number, then the selected meeting reservation controller allocates in real-time the second number of video ports to the video conference and bridges to another one of the at least one video conference control system that has a third number of video ports such that the second number plus the third number of video ports connect the at least one other video conference participant through the circuit switched communications network, the another one of the at least one video conference control system allocates in real-time the third number of video ports for the video conference.

9. The on-demand real-time video conferencing system of claim 8, wherein if no other one of the at least one video conference control system has the third number of video ports so that the second number plus the third number of video ports connect to the at least one other video conference participant, then the selected meeting reservation controller informs the user that the video conference cannot be provided and ends the call from the user.

10. The on-demand real-time video conferencing system of claim 3, wherein the on-demand request from the user further includes:

at least one of a user identification number and a password, if the at least one of the user identification number and the password is incorrect, then the meeting reservation controller ending the call from the user.

11. The on-demand real-time video conferencing system of claim 3, wherein the on-demand request from the user further includes:

billing information, the billing information indicating at least one of the user paying a cost of the video conference and each video conference participant paying for a portion of the cost of the video conference, the meeting reservation controller billing the cost of the video conference based on the billing information.

12. The on-demand real-time video conferencing system of claim 2, wherein the voice response unit comprises:

a voice recognition device, the voice recognition device converting words spoken by the user into messages received by the meeting reservation controller.

13. The on-demand real-time video conferencing system of claim 2, wherein the selected one of the at least one video conference control system is selected based on at least one of availability of video ports of each of the at least one video conference control system and availability of connection paths in the circuit switched communications network.

14. The on-demand real-time video conferencing system of claim 1, wherein the circuit switched communications network is a narrow band network.

15. The on-demand real-time video conferencing system of claim 14, wherein the narrow band network has a data transfer rate of between about 56 K bit/sec and 1536 K bit/sec in increments of one of 56 K bit/sec and 64 K bit/sec.

16. The on-demand real-time video conferencing system of claim 14, wherein the narrow band network has an ISDN protocol.

17. The on-demand real-time video conferencing system of claim 1, wherein the user and the at least one other video conference participant are connected by dedicated lines.

18. A method for providing a video conference using an on-demand real-time video conference system in a circuit switched communications network, comprising:

receiving an on-demand request from a user; and connecting in real-time the user with at least one other video conference participant through the circuit switched communications network based on the on-demand request received from the user and availability of at least one video conference control system remote from users of the video conference system and the circuit switched communications network.

19. The method of claim 18, further comprising:

selecting one of the at least one video conference control system to respond to a call from the user, a selected meeting reservation controller of the selected one of the at least one video conference control system receiving the on-demand request from the user through a voice response unit of the selected one of the at least one video conference control system.

20. The method of claim 19, wherein the receiving step comprises:

outputting prompts using the selected meeting reservation controller to the user through at least one audio port of the selected video conference control system, the at least one audio port being coupled to the circuit switched communications network through one of a plurality of video ports of the video conference connection unit of the selected video conference control system; and receiving the on-demand request from the user through the at least one audio port of the selected video conference control system, the on-demand request from the user including at least one telephone number of at least one other video conference participant.

21. The method of claim 20, further comprising:

allocating in real-time a first number of video ports of the selected video conference control system for the video conference if the selected video conference control system has the first number of video ports that are connectable to the at least one other video conference participant through the circuit switched communications network.

22. The method of claim 20, further comprising:

transferring the call from the user to another one of the at least one video conference control system that has a first number of video ports connectable to the at least one other video conference participant for the video conference if the selected one of the at least one video conference control system does not have the first number of video ports connectable to the at least one other video conference participant through the circuit switched communications network; and informing the user that the video conference cannot be provided and ending the call from the user if no other one of the at least one video conference control system has the first number of video ports connectable to the at least one other video conference participant, the selected meeting reservation controller.

23. The method of claim 22, wherein the selected meeting reservation controller transfers the on-demand request received from the user to the another one of the at least one video conference control system when transferring the call from the user.

24. The method of claim 20, further comprising:

allocating in real-time a second number of video ports of the selected one of the at least one video conference control system and allocating in real-time a third number of video ports of another one of the at least one video conference control system to the video conference if the second number is less than the first number and the second number plus the third number of video ports connect the at least one other video conference participant through the circuit switched communications network;

bridging the second and third numbers of video ports; and informing the user that the video conference cannot be provided and ending the call from the user if no other one of the at least one video conference control system has the third number of video ports connectable to the at least one other video conference participant.

* * * * *